Patented Sept. 4, 1951

2,567,110

UNITED STATES PATENT OFFICE 2,567,110

ORGANOPOLYSILOXANES PREPARED BY THE REACTION OF SALTS OF SILANOLS WITH HALOSILANES

James Franklin Hyde, Corning, N. Y., assignor to Corning Glass Works, Corning, N. Y., a corporation of New York No Drawing. Application July 12, 1947, Serial No. 760,710

8 Claims. (Cl. 260—448.2)

The present invention relates to improved methods for the production of organosiloxanes.

This application is in part a continuation of my copending application Serial No. 628,965, filed November 15, 1945, and my copending applications with Oscar K. Johannson, Serial No. 712,040, now U. S. Patent 2,472,799, and Serial No. 721,460 now U. S. Patent 2,438,055, filed November 25, 1946, and January 10, 1947, respectively.

The properties of copolymeric organosiloxanes, such as resistance to decomposition and small change in physical properties at elevated temperatures, hydrophobic character, high dielectric capacity, and chemical inertness, suggest many uses for these compositions. The organosiloxane copolymers are of utility as lubricants, dielectric fluids, synthetic resins, paint and varnish vehicles, heat transfer media, hydrophobic agents for fabrics and ceramics, hydraulic fluids, and intermediates in the production of siloxane elastomers.

Formerly, the organosiloxane copolymers which contain mono-, di-, or tri-organo substituted siloxane structural units have been prepared by several methods. In general, such copolymers have been prepared by the hydrolysis and co-condensation of silanes containing the desired organic groups attached to silicon atoms through carbon to silicon bonds. The remaining valence bonds of the silicon atoms of the silanes may be satisfied with readily hydrolyzable groups, such as halogen atoms or alkoxy radicals. The hydrolysis may be effected by reacting a mixture of silanes with water. Frequently, during the hydrolysis of a mixture of organosilicon halides, a portion of the hydrolyzate separates from the hydrolysis mixture as insoluble solid matter which has not entered into the copolymer. The hydrolyzate may contain residual hydroxyl groups which may be removed by condensation of the hydrolyzate as by heating. The physical properties of the organosiloxane copolymers are largely dependent upon the siloxane units present in the polymer, the proportions in which such structural units are present, and the extent of bodying of the hydrolyzate.

Objects of the present invention are to provide improved methods for the production of organosiloxanes of definite structure, to provide improved methods for the production of organosiloxane copolymers which contain a controlled amount of hydroxyl groups, and to provide improved methods for the production of completely condensed organosiloxane copolymers.

Other objects and advantages of the present invention will be evident from the following description.

In a preferred form of the present invention, organosiloxanes are prepared by the reaction of an alkali metal salt of an organo silanol with a silicon halide. The siloxanes so produced may be recovered from the reaction mixture.

The alkali metal salts of the organo silanols are organosilicon compositions in which an alkali metal is substituted for the hydrogen in one or more hydroxyls of a silanol which contains at least one silicon atom bonded to one or more organic radicals by carbon to silicon bonds, the silicon also being bonded to one or more of the indicated hydroxyls. The alkali metal salts may contain one, two, or three organic groups attached to the silicon atoms of the silanol by carbon to silicon bonds. The hydrocarbon radicals of the alkali metal salts may be alkyl radicals such as methyl, ethyl, propyl and higher; aryl, aralkyl, or alkaryl radicals such as phenyl, benzyl, or tolyl; or any combination of alkyl, aryl, aralkyl, or alkaryl radicals.

The alkali metal salts of the mono-organo silanols are organosiloxanes in which the structure is dependent upon the molar ratio of alkali metal to silicon. The mono-organo silicon salts have been prepared which have one, two, and three alkali metal atoms per silicon. These appear to be compounds which correspond to the following type formulae:

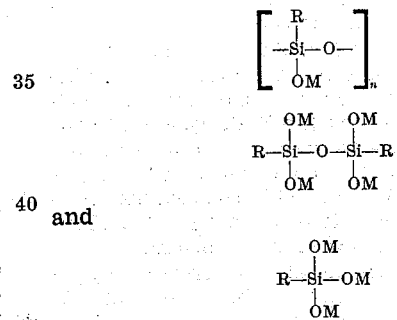

and in which R represents a hydrocarbon radical, as above defined, M represents an alkali metal, and $n$ is a whole number.

The alkali metal salts of the diorgano silanols are organosiloxanes of the general type formula $MO(R_2SiO)_nM$, in which R represents a hydrocarbon radical as above defined, M represents an alkali metal, and $n$ represents a whole number. The molar ratio of alkali metal to silicon in the siloxane largely determines the value of $n$.

The alkali metal salts of the triorgano silanols are organosilanes which correspond to the type formula R₃SiOM, in which R represents a hydrocarbon radical as above defined, and M represents an alkali metal. The molar ratio of alkali metal to silicon is one in the tri-organo salts. These salts are assumed to be similar in structure to the mono-silanes.

The alkali metal salts of the organosilanols may form crystalline complex compounds which contain water of crystallization. Each salt is capable of forming a series of crystalline hydrates which contain varying amounts of water of crystallization. The amount of water which may be held in the crystal structure varies but in general those hydrates which contain less than about 3 mols of water per equivalent of alkali metal are stable, crystalline compounds. The alkali metal salts may, under certain conditions, form crystalline complexes with an alcohol or an alkali metal hydroxide.

The alkali metal salts of the organosilanols may be prepared by the reaction of alkoxy silanes containing the desired hydrocarbon radicals, the corresponding silanols, hydrolysis products of organosilanes which contain the desired organic groups and readily hydrolyzable groups such as alkoxy radicals or halogen atoms, or condensed siloxanes which contain the desired organic groups with an alkali metal oxide in the presence of water. The alkali metal oxide and water may be added to the reaction mixture as the alkali metal hydroxide or as an aqueous solution of the hydroxide. In order to effect more intimate contact between the reactants, a lower aliphatic alcohol of boiling point below that of water may be added to the reaction mixture. By the elimination of water from the system, crystalline hydrates of the desired alkali metal salts are obtained.

The hydrated salts thus obtained may be dehydrated by subjecting the hydrates to a high vacuum in the presence of a dehydrating agent. By selective dehydration, salts containing various amounts of water of crystallization may be obtained. Anhydrous salts may also be prepared by the addition to the reaction mixture of a solvent of boiling point greater than that of water. After the removal of the water and alcohol from the reaction mixture by boiling, the desired anhydrous salt may be obtained from solution in the solvent. Pyridine and toluene are examples of suitable higher boiling solvents.

The anhydrous alkali metal salts may be prepared by the reaction of alkoxy silanes containing the desired organic radicals, or products such as may be produced by the hydrolysis and condensation thereof, with alkali metal oxides under substantially anhydrous conditions. A lower aliphatic alcohol may be added to the reaction mixture to increase the rate of reaction either alone or in addition to other organic solvents.

The specific alkali metal salt formed may be controlled to some extent by the alkali metal to silicon ratio in the reaction mixture as well as by the organosilicon material in the reaction mixture. For example, the salts $(RSiOOM)_n$, $[RSi(OM)_2]_2O$, $RSi(OM)_3$ may be prepared by the use of different proportions of the same reagents. Also the value of $n$ in the salt $$MO(R_2SiO)_nM$$

may be varied by variation of the ratio in which the reactants are employed.

The silicon halides employed in the present invention are compounds which contain at least one halogen atom attached to a silicon atom. The remaining valences of the silicon atoms may be satisfied with halogen atoms, organic radicals, or siloxy radicals. $SiX_4$, $RSiX_3$, $R_2SiX_2$, $R_3SiX$, and $X(R_2SiO)_nR_2SiX$, where R represents a hydrocarbon radical as above defined and X represents a halogen atom, are illustrative of suitable silicon halides.

It has been found that the alkali metal salts and the silicon halides enter into metathetic reactions. The principal products of such reaction are the siloxane, in which the silicon of the salt is attached to the silicon of the halide by an oxygen atom, and the alkali metal halide. The alkali metal halides are insoluble in the siloxanes and in organic solvents. Thus, by removal of one of the products as an insoluble material, the reaction proceeds to completion. Siloxanes, which contain more than one type of siloxane structural unit, may be produced by the reaction of the alkali metal salts with mixtures of silicon halides or by the reaction of a mixture of alkali metal salts with a silicon halide.

Siloxanes may be produced by the reaction of the hydrates of the alkali metal salts and the silicon halides. However better yields and more consistent results are obtained if the reaction mixture is maintained substantially anhydrous. The silicon fluorides are more stable with respect to water. The silicon fluorides may be reacted with the salt hydrates.

It is preferred that at least one of the reactants be present as a liquid phase. The silicon halides, at atmospheric pressure and room temperatures, are generally liquids. Reaction occurs on the addition of one of the reactants to the other. If desired, a solvent such as diethyl ether, dioxane, petroleum ether, toluene, benzene, or pyridine may be added to the reaction mixture. By the use of such a solvent more intimate contact between the reactants is obtained, and the rate of reaction is increased. The solvent may be introduced into the reaction mixture as a solvent for either or both of the reactants, or it may be added to a mixture of the reactants.

The reaction between the alkali metal salts of organo silanols and the silicon halides may take place under widely varied conditions. The rate of reaction may be increased by heating, or decreased by cooling the reaction mixture. The order of addition of the reactants may be varied. Reaction takes place upon the addition of either of the reactants to the other. However, in certain reactions the yield of any particular siloxane may depend to some extent upon the order of addition of the reactants. Thus, in some reactions it is desirable to add the silanol salt to the silicon halide, while in other reactions it is desirable to reverse the order of addition.

Several types of siloxanes may be produced by the reaction of the alkali metal salts of the organosilanols with the silicon halides. The type of siloxane produced is dependent upon the ratio in which the reactants are present in the reaction mixture, as well as upon the specific reactants employed.

Completely condensed siloxanes may be prepared by the reaction of an alkali metal salt of an organo silanol with an equivalent amount of a silicon halide. The siloxanes thus produced contain no residual groups hydrolyzable upon contacting the siloxanes with water. For example, alkali metal salts of triorgano silanols may be reacted with organosilicon halides to produce completely condensed siloxanes. In the following equations, R represents a hydrocarbon radical as above defined, M represents an alkali metal, and X represents a halogen atom.

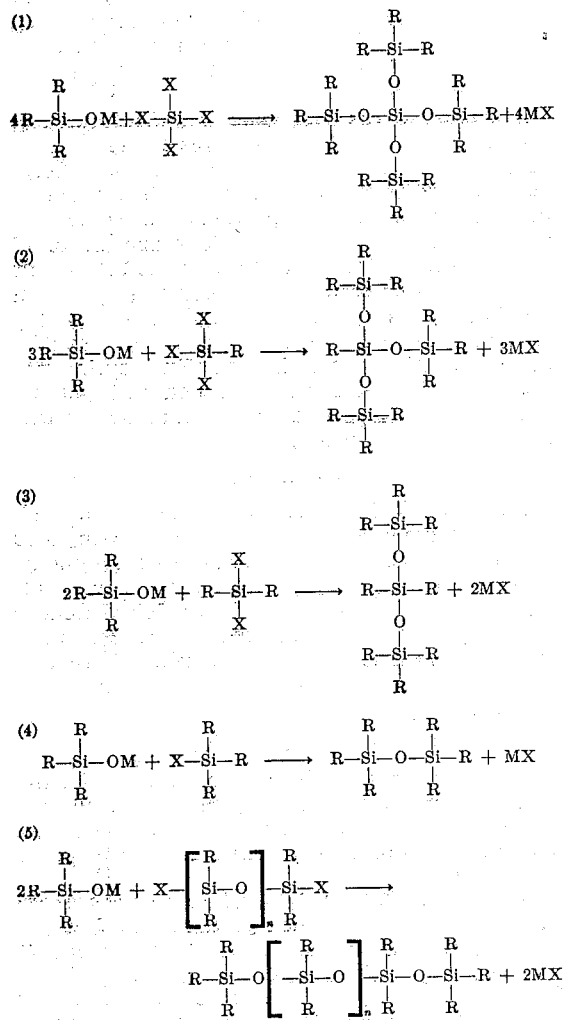

The following illustrate types of reactions which are obtained with salts of diorganosilanols and partially condensed derivatives thereof:

The salts of Equations 6 and 7 may likewise be reacted with silicon tetrahalide or mono or diorgano silicon halides with the production of completely condensed complex siloxanes.

Likewise with respect to the three types of mono-organo substituted silicon salts above referred to, simple compounds are obtainable by reacting them with a triorganosilicon halide, whereas completely condensed complex siloxanes are obtained when they are reacted with the silicon halides of lower degree of organic substitution.

Siloxanes capable of further condensation may also be prepared by the reaction of an alkali metal salt with a silicon halide by having one of the reactants in excess in the reaction mixture. The use of an excess of either the alkali metal salt or of the silicon halide results in the formation of copolymers which, upon hydrolysis, are capable of further condensation. By the use of an excess of silicon halide in the reaction mixture a siloxane may be produced which contains halogen radicals attached to silicon atoms. The halogen substituents may be removed by washing the siloxane with an excess of water. Following the washing the siloxane contains residual hydroxyl groups which may be removed by bodying or condensing the siloxane. The amount of residual hydroxyl groups in the washed siloxanes is dependent upon the amount of excess silicon chlorides in the reaction mixture. In this manner the extent of condensation of the siloxanes may be controlled.

Copolymers consisting of more than two organosiloxane structural units may be prepared by the use of the method as herein described. A mixture of silicon halides may be reacted with an alkali metal salt of an organosilanol, or a mixture of salts may be reacted with a silicon halide. The extent of condensation of the siloxane copolymer produced may be controlled by the ratio of total halide to total alkali metal in the reaction mixture.

The composition of the copolymers produced by the methods as herein described is not entirely determined by the random distribution of the siloxane structural units throughout the copolymer structure. Thus copolymers of definite composition and molecular size may be prepared in excellent yield by the methods of the present invention. Also, certain disadvantages of the hydrolysis procedure, such as the formation of insoluble matter during the hydrolysis of a mixture of silanes, are eliminated by the methods of the present invention.

The following examples illustrate specific modes of employing the process of the present invention:

*Example 1*

$[CH_3SiOONa]_n$ was prepared by reacting a 50 per cent by weight aqueous solution of NaOH with a monomethyl siloxane hydrolyzate in equal molecular amounts. Ethyl alcohol was added in amount to give a single phase reaction mixture. Upon removal of solvent and water by distillation, a white crystalline powder was obtained. The powder was dehydrated by heating at a temperature of 170° C. over phosphorous pentoxide until a constant weight was obtained. The neutralization equivalent of the salt thus obtained was 102.4. The calculated neutralization equivalent of anhydrous $[CH_3SiOONa]_n$ is 98.

A copolymer consisting of monomethyl siloxane structural units and trimethyl siloxane structural units was prepared as follows:

The above salt was added to a 54 per cent by weight solution of $(CH_3)_3SiCl$ in a mixed solvent composed of 8.5 per cent by weight anhydrous pyridine and 91.5 per cent by weight anhydrous diethyl ether in a reaction vessel in amount to give a sodium to chlorine atomic ratio of 3 to 5. NaCl precipitated from the reaction mixture and was removed by filtration. The solvent and excess $(CH_3)_3SiCl$ were removed from the filtrate by distillation. A copolymer of 473 centistokes viscosity was obtained. The copolymer was distilled at 15 mm. pressure. 86 per cent of the copolymer was non-volatile at 355° C., and 15 mm. pressure. The viscosity of the residue was 830 c. s.

*Example 2*

$C_6H_5SiOONa_n$ containing 0.5 mol of water of hydration per sodium atom was prepared by the reaction of monophenyl siloxane hydrolyzate with sodium hydroxide. Saturated aqueous sodium hydroxide was added with stirring to a 41.1% solution by weight of $C_6H_5SiO_{1.5}$ in a mixed solvent composed of 56.4 per cent by weight ethanol, 11.8 per cent by weight benzene, and 31.8 per cent by weight water, in amount to give a silicon to sodium ratio of 1. The reaction mixture was heated to reflux temperature and the solvent was removed under reduced pressure. The salt obtained on removal of solvent was dissolved in a solvent composed of 47.5 per cent by weight toluene, 50.7 per cent by weight ethanol, and 1.8 per cent by weight water. The salt was dissolved in the solvent at the boiling point. Upon cooling, crystals were obtained which had a neutralization equivalent 214.5. The salt was dehydrated at 170° C. over phosphorous pentoxide until a constant weight was obtained. The neutralization equivalent was then 168. The calculated neutralization equivalent of the anhydrous salt is 160. This indicates the salt is the compound $[C_6H_5SiOONa]_n$ containing 0.5 mol of water of hydration per equivalent of sodium.

A copolymer of mono-phenylsiloxane units and trimethyl siloxane units was prepared as follows:

The above salt was added with stirring to a 16.5 per cent by weight solution of $(CH_3)_3SiCl$ in a mixed solvent composed of 35.5 per cent by weight diethylether and 64.5 per cent by weight toluene in amount to give a sodium to chlorine atomic ratio of 2 to 3. The reaction was complete after 5 hours. The sodium chloride which had precipitated during the reaction was removed by filtration after 16 hours. The residue was extracted with diethyl ether. The solvent and excess $(CH_3)_3SiCl$ were removed from the ether extract by distillation. An 85 per cent yield of an oil of 116,500 c. s. viscosity was obtained.

Example 3

A copolymer comprised of monophenyl siloxane units and dimethyl siloxane units was prepared as follows:

The salt described in Example 2 was added with stirring to a 6 per cent by weight solution to $(CH_3)_2SiCl_2$ in diethyl ether in amount to give a sodium to chlorine atomic ratio of 1. NaCl precipitated immediately from the reaction mixture and was removed by filtration. The solvent was removed from the filtrate by distillation under reduced pressure. A hard brittle resin was thus obtained. The resin did not melt on heating to 300° C. but passed through a rubbery stage and a punky gel state as the temperature was increased, and reverted to its original state upon cooling.

Example 4

$(C_6H_5)(C_2H_5)Si(OC_2H_5)_2$ was added with stirring to sufficient water to hydrolyze the silane to the siloxane. An amount of NaOH was present in the hydrolysis menstrum to give a silicon to sodium ratio of 3. The water and ethyl alcohol in the reaction mixture was removed by distillation at reduced pressure. A clear, viscous fluid was obtained which contained NaO $$[(C_6H_5)(C_2H_5)SiO]_nNa$$

where $n$ has an average value of 6.

A copolymer consisting of phenyl ethyl siloxane structural units and siloxane structural units containing no organic substituents was prepared as follows:

A 4.7 per cent by weight solution of $SiCl_4$ in benzene was added with stirring to a 35.8 per cent by weight solution of the above salt in benzene in amount to give a chlorine to sodium ratio of 1.

NaCl precipitated from the reaction mixture immediately. After a period of 2 hours the reaction mixture was diluted with diethyl ether and washed with dilute aqueous HCl and water. NaCl was removed by this wash. The solvent and water were removed by distillation under reduced pressure. A clear, water white liquid remained. The absence of free silicic acid indicated complete copolymerization.

A portion of the copolymer was maintained at a temperature of 250° C. for 108 hours without gelation. At the end of this period the copolymer was viscous and tacky at 25° C., but still quite fluid at 250° C. Another portion of the copolymer was air-blown at a temperature of 220° C. for 72 hours to give a high viscosity resin. A 70 per cent solution of this resin was applied to a cadmium coated copper strip. The coated metal was heated for one hour at 150° C., and for 8 hours at 250° C. The coating was tack-free. The coating was unaffected by heating for 100 hours at 250° C., and could be bent over a 0.125 inch mandrel without cracking the coating.

Example 5

$NaO[(C_6H_5)(C_2H_5)SiO]_nNa$, where $n$ has an average value of 4, was prepared by reacting a 50 per cent solution of aqueous NaOH with a phenyl ethyl siloxane hydrolyzate in amount to give a silicon to sodium ratio of 2 to 1. Sufficient toluene was added to obtain a homogeneous reaction mixture. The reaction mixture was heated to remove water by distillation. Thus a substantially anhydrous toluene solution of $$NaO[(C_6H_5)(C_2H_5)SiO]_nNa$$

where $n$ has an average value of 4, was obtained.

A copolymer consisting of phenyl ethyl siloxane structural units and siloxane structural units containing no organic substituents was prepared as follows:

A 50 per cent by weight solution of the above salt in toluene was added gradually to a 20 per cent by weight solution of $SiCl_4$ in toluene in amount to give chlorine to sodium ratios of 1, 2, and 3 respectively. In each case a precipitate of NaCl formed immediately. The reaction mixtures were stirred until reaction was complete and refluxed for a short time to insure complete reaction. The reaction mixtures were washed with water until neutral. The NaCl was removed by this wash. The results obtained from the copolymerization are summarized in the following table:

| Cl/Na | Yield[1] | OH | Visc. (C. S.) | $SiO_2\%$ Calc. | Found | Wt. Loss, 3 Hrs., 250° C. |
|---|---|---|---|---|---|---|
| | Per cent | Per cent | | | | Per cent |
| 1 | 97.2 | 0.99 | 2,058 | 42.5 | 42.39 | 36.4 |
| 2 | 100.5 | 2.7 | 6,259 | 44.8 | 44.08 | 22.7 |
| 3 | 100.3 | 2.3 | 10,000 | 47.3 | 44.95 | 27.3 |

[1] Theoretical yield calculated on anhydrous basis.

It is evident from the relatively low viscosities and the absence of gelation even after heating at 250° C. for 3 hours, that the product contains a large proportion spiro structures.

Example 6

$(C_6H_5)(C_2H_5)Si(OC_2H_5)_2$ was added with stirring to sufficient water to hydrolyze the silane to the siloxane. An amount of NaOH was present in the hydrolysis menstruum to give a silicon to sodium ratio of 5. The water and alcohol in the reaction mixture were removed by distillation under reduced pressure to give a clear, extremely viscous mass containing $$NaO[(C_6H_5)(C_2H_5)SiO]_nNa$$

where $n$ has an average value of 10.

A copolymer consisting of phenyl ethyl siloxane structural units and siloxane structural units containing no organic substituents was prepared as follows:

A 27 per cent by weight solution of this salt in benzene was added with stirring to a 7 per cent by weight solution of $SiCl_4$ in benzene in amount to give a chlorine to sodium ratio of 4. NaCl precipitated immediately. The reaction mixture was stirred for 15 hours. The reaction mixture was then diluted with a volume of ether equal to one-half the volume of the reaction mixture. This solution was washed with water to remove the NaCl and to hydrolyze residual chlorine. An oil of 3,333 c. s. viscosity remained on evaporation of solvent and water. After standing 120 hours the viscosity of the oil increased to 6,500 c. s. The viscosity was 3,334 c. s. after heating at 400° C. for 1 hour. The heating may have caused bond rearrangement with the formation of cyclic siloxanes. Air blowing at 220° C. increased the viscosity of the 6,500 c. s. material but did not cause gelation.

Example 7

A copolymer consisting of phenyl ethyl siloxane structural units and phenyl siloxane structural units was prepared as follows:

A 31 per cent by weight solution of the sodium salt described in Example 6, in benzene was added gradually with stirring to a 17 per cent by weight solution of phenyl silicon trichloride in benzene in amount to give a chlorine to sodium ratio of 3. NaCl precipitated from the reaction mixture immediately. The NaCl was filtered from the reaction mixture. The solvent was removed by distillation at reduced pressure. The residue was washed with water until neutral. A liquid of 3,720 c. c. viscosity at 25° C. remained. After heating at 250° C. for 24 hours, the viscosity of the liquid increased greatly. The heat-bodied resin was applied to a cadmium-coated copper plate and heated 44 hours at 250° C. A tough, leather-like coating was obtained. The resin also may be bodied by airblowing at elevated temperatures.

Example 8

Powdered KOH (neutralization equivalent= 61.6) was added with stirring to a 33.3 per cent by weight solution of $[(CH_3)_2SiO]_3$ in toluene in amount to give a silicon to potassium ratio of 117. The viscosity of the reaction mixture became constant at 25.32 centistokes after a total of 144 hours at 100° C. Metallic potassium was added to the reaction mixture in amount sufficient to react with the water present due to the use of powdered KOH. After the addition of the metallic potassium, the silicon to potassium ratio was 58.5. Thus, a toluene solution of anhydrous $KO[(CH_3)_2SiO]_nK$ was prepared in which $n$ has an average value of 117. The viscosity of the salt solution was 16.08 c. s. after heating at 100° C. for 24 hours.

A high molecular weight copolymer consisting of dimethyl siloxane structural units was prepared as follows:

$(CH_3)_2SiCl_2$ in toluene solution was added to the salt in amount calculated to give a chlorine to sodium ratio of 1 NaCl precipitated on the addition of the $(CH_3)_2SiCl_2$. After 48 hours at 100° C. the viscosity of the reaction mixtures had risen to 24.70 c. s., although the reaction mixture was alkaline.

A 1 per cent solution of $(CH_3)_2SiCl_2$ in toluene was added in amount sufficient to neutralize the reaction mixture. After 72 hours at 100° C. the viscosity of the neutral solution increased to 43.47 c. s.

The relationship of time and viscosity is shown in the accompanying table:

| Time (hours) | Viscosity (centistokes at 25° C.) |
| --- | --- |
| 144 | 25.32 |
| 168 | 16.08 |
| 216 | 24.70 |
| 288 | 43.47 |

Example 9

$(C_6H_5)_2Si(ONa)_2$ was prepared by the reaction of $Na_2O$ was added with stirring to a 13.8 per cent by weight solution of $[(C_6H_5)_2SiO]_4$ in toluene in amount to give a silicon to sodium ratio of 0.5. Sufficient methanol was added to the reaction mixture to disperse the $Na_2O$. The reaction was complete in two hours. The solvent was removed by distillation at reduced pressure. A white powder remained after removal of the solvent. The powder was dehydrated by heating over phosphorus pentoxide at a temperature of 100° C. for 24 hours, and at 170 C. for 48 hours. The neutral equivalent of the product was 135. The calculated neutral equivalent for anhydrous $(C_6H_5)_2Si(ONa)_2$ is 130.

A copolymer consisting of diphenyl and dimethyl siloxane structural units was prepared by adding this salt with stirring to a 19.6 per cent anhydrous pyridine solution of $(CH_3)_2SiCl_2$ in a reaction vessel in amount to give a chlorine to sodium atomic ratio of 1.5. A precipitate of NaCl formed immediately in the reaction mixture. After 1 hour a volume of pyridine equal to one-half the volume of the original solution was added to the reaction mixture. After 16-18 hours an equal volume of 28.5 per cent solution of water in pyridine was slowly added to the reaction mixture. The precipitated NaCl was removed by filtration, and the filtrate was washed with water until neutral. Upon removal of the salt an 85% yield of a 3,835 c. s. oil was obtained. The oil contained 1.29 per cent by weight hydroxyl groups. A portion of the oil was treated with 0.4 per cent by weight of a 50 per cent aqueous solution of KOH at a temperature of 100° C. In less than one hour the copolymer was converted into a tacky, infusible gel.

Example 10

$KO[(CH_3)_2SiO]_nK$ in which $n$ has an average value of 382, was prepared by the addition of powdered KOH with stirring to $[(CH_3)_2SiO]_3$ in a reaction vessel in amount to give a silicon to potassium ratio of 191. The reaction mixture was maintained at a temperature of 77° C. during the addition.

A copolymer consisting of dimethyl siloxane and trimethyl siloxane structural units was prepared by adding trimethyl silicon monochloride, in diethyl ether solution to portions of the salt heated for varying times at 77° C. in amount to give a chlorine to potassium ratio of 1. Potassium chloride precipitated from the copolymer solution. The KCl was removed by filtration and the ether was removed by distillation at atmospheric pressure. The copolymers were heated at 110° C. under reduced pressure for a period of 2 hours, cooled, and weighed. The percentage of high polymer siloxane salt present was calculated from the ratio of weight of the copolymer to the initial weight of the respective portion. The error introduced in the calculations due to the replacement of potassium (atomic weight 29.1) by a $(CH_3)_3Si$— group (equivalent weight 73) is slight. Thus, in the salt $KO[(CH_3)_2SiO]_{382}K$, this error is 0.24 per cent.

The following table illustrates the relation of heating time to polymerization:

| Heating Time (77° C.) | High Polymer Siloxane Salt |
|---|---|
| Minutes | Per cent |
| 5 | 30.3 |
| 10 | 68.0 |
| 15 | 93.0 |
| 20 | 94.5 |
| 25 | 96.4 |
| 30 | 96.6 |

*Example 11*

$(CH_3)_3SiOK$ was prepared by the reaction of KOH with hexamethyldisiloxane. KOH containing 16.7% water was added to $[(CH_3)_3Si]_2O$ in a reaction vessel in amount to give a sodium to silicon atomic ratio of 1. Sufficient methanol to disperse the alkali was added to the reaction mixture. The reaction mixture was allowed to stand at room temperature for 12 hours. It was then heated to a temperature just below boiling for 24 hours. The reaction mixture was refluxed and the weight loss of the reaction mixture was made up by the addition of hexamethyldisiloxane. The reaction mixture was extracted with diethyl ether in a Soxhlet extractor. The ether extract was evaporated to dryness and placed under a high vacuum.

A copolymer consisting of dimethyl siloxane and trimethyl siloxane structural units was prepared by adding this salt with stirring to $[(CH_3)_2SiO]_4$ at a temperature of 77° C. in amount to give a silicon to potassium ratio of 190. The reaction vessel was maintained at 77° C. for 20 hours. The reaction mixture was cooled, weighed, and an equal amount by weight of a 2 per cent solution of $(CH_3)_3SiCl$ in diethyl ether was added. The solvent was removed by distillation and the mixture was maintained at a temperature of 95° C. for 3 to 4 hours at a pressure of 15 mm. to remove the unreacted $[(CH_3)_2SiO]_4$. 88 per cent of the $[(CH_3)_2SiO]_4$ was converted to higher boiling polymer by this treatment.

The same reactants were maintained at a temperature of 171° C. for 5 minutes. The reaction mixture was cooled, weighed, and $(CH_3)_3SiCl$ was added as before. In this instance, 85 per cent of the $[(CH_3)_2SiO]_4$ was converted to higher boiling polymer.

*Example 12*

$KO[(CH_3)_2SiO]_nK$ in which $n$ has an average value of 400, was prepared by the addition of powdered KOH with stirring to $[(CH_3)_2SiO]_5$ in a reaction vessel in amount to give a silicon to potassium average ratio of 200. The reaction mixture was maintained at a temperature of 120° C.

A copolymer consisting of dimethyl siloxane and trimethyl siloxane structural units was prepared as follows:

The salt prepared as above was maintained at a temperature of 120° C. Portions of the salt were removed at 5-minute intervals, cooled, and weighed. Trimethyl silicon monochloride, in diethyl ether solution was added to the weighed portion of the salt in amount to give a chlorine to potassium ratio of 1. Potassium chloride readily precipitated from the copolymer solution. The KCl was removed by filtration. The ether was removed from the solution by distillation at atmospheric pressure. The copolymer was maintained at a temperature of 110° C. at reduced pressure for a period of 2 hours, cooled, and weighed. The percentage of dimethyl siloxane polymerized to high boiling material by the treatment with KOH at 120° C. was calculated from the ratio of weight of the copolymer to the initial weight of the respective portion.

The following table illustrates the relation of heating time to polymerization:

| Heating Time (120° C.) | Siloxane Polymerized |
|---|---|
| Minutes | Per cent |
| 5 | 18 |
| 10 | 45 |
| 15 | 55 |
| 20 | 64 |
| 30 | 79 |
| 40 | 84 |
| 50 | 88 |

By the addition of the $(CH_3)_3SiCl$ to the salt, reaction occurred which eliminated KCl and introduced $(CH_3)_3Si$— units at the ends of the polymer molecules.

*Example 13*

$NaO[(C_6H_5)(CH_3)SiO]_nNa$ in which $n$ has an average value of 4, was prepared by the reaction of sodium oxide with the cyclic tetramer of phenyl methyl siloxane. $Na_2O$ was added with stirring to a 63 per cent solution of

$[(C_6H_5)(CH_3)SiO]_4$ in petroleum ether, boiling range 30–60° C., to give a silicon to sodium ratio of two. 4.4 per cent by weight methanol was added to the reaction mixture. The reaction was complete after 8 hours reflux. Upon removal of the solvent at reduced pressure, a thermoplastic solid material remained in the reaction vessel. After desiccation over phosphorous pentoxide, the neutralization equivalent of the solid became constant at a value of 320. The neutralization equivalent indicates that the solid is a mixture of sodium salts of the type $NaO[(C_6H_5)(CH_3)SiO]_nNa$ in which $n$ has an average value of 4.

A copolymer consisting of phenyl methyl siloxane and trimethyl siloxane structural units was prepared as follows:

183.7 grams of a 32 per cent solution of phenyl methyl siloxane sodium salt, as prepared above, in ether, boiling range 30–60° C., was added with stirring to 79 grams of a 19 per cent solution of $(CH_3)_3SiCl$ in petroleum ether, boiling range 30–60° C. When the reaction was complete, the reaction mixture was washed with aqueous sodium bicarbonate solution, dilute aqueous acetic acid solution, and water until neutral. The solvent was removed at reduced pressure, and the siloxane mixture was distilled at a pressure of 1 mm.

A distillation analysis of the siloxane mixture gave the following results:

| Pressure | Temp. (°C.) | Visc. (C. S.) | Per Cent Yield |
|---|---|---|---|
| 1 mm | 80-150 | | 9.5 |
| 1 mm | 150-200 | 14.5 | 26 |
| 1 mm | 200-250 | 51.8 | 31 |
| 1 mm | 250-300 | 118.5 | 24 |
| Residue | | | 9.5 |
| Total | | | 100.0 |

The material of boiling point greater than 200° C. at a pressure of 1 mm. is of utility as a vacuum diffusion pump fluid.

Example 14

Na$_2$O was added with stirring to a 60 per cent solution of [(CH$_3$)$_2$SiO]$_4$ in pyridine in a reaction vessel in amount to give a silicon to sodium ratio of 2, whereby to produce the salt NaO[(CH$_3$)$_2$SiO]$_3$Na reaction was complete in 15 hours. The reaction mixture was filtered and the residue dried under reduced pressure. The residue, containing the desired sodium salt, was dissolved in acetone and recrystallized by the addition of toluene. The crystals so obtained were filtered, washed with toluene and diethyl ether, and dried under vacuum. The dried salt was then desiccated over anhydrous phosphorous pentoxide at 15 mm. pressure and at a temperature of 170° C. for 15 hours. The neutralization equivalent of the material was 145.8. The calculated neutralization equivalent of the anhydrous salt is 142.0. By analysis the sodium to silicon ratio was found to be 0.650, while the calculated value is 0.666. The following X-ray diffraction pattern was obtained:

| D | I/I$_0$ |
|---|---|
| 5.77 | 1.00 |
| 4.50 | 1.00 |
| 5.26 | 0.64 |
| 4.18 | 0.64 |
| 2.57 | 0.52 |

NaO[(CH$_3$)$_2$SiO]$_3$Na, prepared as above, was added with stirring to (CH$_3$)$_3$SiCl, in the form of an 8.5 per cent solution in toluene, in amount to give a sodium to chlorine ratio of 1. The reaction mixture was cooled with ice by indirect heat exchange. After the reaction was complete, the reaction mixture was washed with a 5 per cent aqueous sodium bicarbonate solution and with water and crushed ice until neutral. The reaction mixture was dried with anhydrous potassium carbonate and filtered. The toluene was removed by distillation at atmospheric pressure. The product was dissolved in diethyl ether, washed with water, and the ether was removed by distillation at atmospheric pressure. The siloxane mixture was distilled at reduced pressure and a 47.6 per cent by weight yield of the desired (CH$_3$)$_3$SiO[Si(CH$_3$)$_2$—O]$_3$Si(CH$_3$)$_3$ was obtained.

Example 15

NaO[(CH$_3$)$_2$SiO]$_3$Na, prepared as in Example 14, was added with stirring to a 7.1 per cent solution of (CH$_3$)$_3$SiCl in anhydrous pyridine, in amount to give a sodium to chlorine ratio of 1. The reaction mixture was cooled by indirect heat exchange with ice. After the reaction was complete, the reaction mixture was washed with 5 per cent aqueous sodium bicarbonate solution and with water and crushed ice until neutral. The siloxane products were removed from the reaction mixture by the use of a separatory funnel. The reaction mixture was dried with anhydrous potassium carbonate and filtered.

Distillation analysis of the siloxane products gave the following results:

| Pressure (mm.) | Temperature (°C.) | Per Cent Yield (based on salt used) |
|---|---|---|
| 12 | under 103 | 2.3 |
| 12 | 103-107 | 75.0 |
| 12 | still hold up | 5.4 |
| Total siloxane products | | 82.7 |

The siloxane of boiling range 103–107° C. was identified as (CH$_3$)$_3$SiO[(CH$_3$)$_2$SiO]$_3$Si(CH$_3$)$_3$.

Example 16

NaO[(C$_6$H$_5$)$_2$SiO]$_2$Na was prepared by the reaction of sodium oxide with octaphenylcyclotetrasiloxane. Na$_2$O was added with stirring to a 16.5 per cent, by weight, solution of

[(C$_6$H$_5$)$_2$SiO]$_4$ in toluene in amount to give a sodium to silicon atomic ratio of 1. Sufficient methanol was added to the reaction mixture to give a single phase system. The reaction mixture was warmed slightly and stirred for 15 to 16 hours. The solvent was evaporated under reduced pressure. The salt thus obtained was dissolved in a mixed solvent of methanol and toluene. The salt solution was left to stand at room temperature for about 120 hours. The salt was recrystallized by partial evaporation of the solvent. The salt was then heated at 100° C. at 1 mm. pressure over anhydrous phosphorous pentoxide for 24 hours. The dehydrated salt had a neutralization equivalent of 227. The calculated neutralization equivalent for anhydrous NaO[(C$_6$H$_5$)$_2$SiO]$_2$Na is 229.

A copolymer consisting of diphenyl siloxane structural units and monophenyl siloxane structural units was prepared as follows:

NaO[(C$_6$H$_5$)$_2$SiO]$_2$Na as above prepared was added with stirring to a 15 per cent by weight solution of C$_6$H$_5$SiCl$_3$ in pyridine in a reaction vessel in amount to give a sodium to chlorine atomic ratio of 1. The mixture was stirred for 48 hours. The reaction mixture was diluted with diethyl ether and washed with water. The solvent was removed at reduced pressure and the copolymer was dried in a high vacuum. An essentially quantitative yield of an oil of 1,163 c. s. viscosity was obtained.

Example 17

NaO[(C$_6$H$_5$)(CH$_3$)SiO]$_2$Na was prepared by the reaction of sodium hydroxide with phenyl methyl siloxane hydrolyzate. (C$_6$H$_5$)(CH$_3$)SiO was added with stirring to a 19.5 per cent solution of NaOH in a mixed solvent composed of 43.5 per cent water and 56.5 per cent ethanol in amount to give a silicon to sodium atomic ratio of 1. The excess water and alcohol were removed at room temperature under vacuum. The reaction mixture was dissolved in toluene and refluxed until all water had been removed from the system. The anhydrous salt is insoluble in toluene. The salt was removed from the toluene by distillation and was washed with petroleum ether, boiling range 30 to 60° C. The salt was dried at 100° C. at 0.1 mm. pressure for 36 hours. An 89 per cent yield of NaO[(C₆H₅)(CH₃)SiO]₂Na was obtained.

A copolymer consisting of phenyl methyl siloxane and phenyl dimethyl siloxane structural units was prepared by adding this salt with stirring to (C₆H₅)(CH₃)₂SiCl in amount to give a chlorine to sodium atomic ratio of 1.065. After stirring 12 hours the reaction mixture was washed with 10 per cent aqueous sodium bicarbonate solution and with water until neutral. The siloxane layer was separated and dried over anhydrous potassium carbonate. The solvent and volatile components were removed at room temperature under vacuum. An 85 per cent yield of

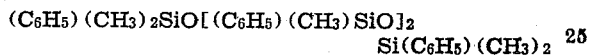
(C₆H₅)(CH₃)₂SiO[(C₆H₅)(CH₃)SiO]₂
Si(C₆H₅)(CH₃)₂ based on sodium salt used, was obtained.

*Example 18*

A copolymer consisting of phenyl methyl siloxane and diphenyl methyl siloxane structural units was prepared by adding the salt

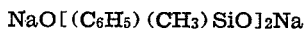
NaO[(C₆H₅)(CH₃)SiO]₂Na prepared as in Example 17 with stirring to a 22 per cent solution of (C₆H₅)₂(CH₃)SiCl in a mixed solvent composed at 87 per cent pyridine and 13 per cent diethyl ether in amount to give a chlorine to sodium ratio of 1.065. After stirring 12 hours, the reaction mixture was washed with 10 per cent aqueous sodium bicarbonate solution and with water until neutral. The siloxane layer was separated and dried over anhydrous potassium carbonate. The solvent and volatile components were removed at room temperature under vacuum. An 80 per cent yield of

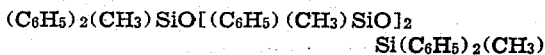
(C₆H₅)₂(CH₃)SiO[(C₆H₅)(CH₃)SiO]₂
Si(C₆H₅)₂(CH₃)

based on sodium salt used, was obtained.

*Example 19*

A copolymer consisting of phenyl methyl siloxane and phenyl siloxane structural units was prepared by adding the salt

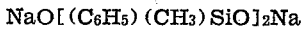
NaO[(C₆H₅)(CH₃)SiO]₂Na prepared as in Example 17, with stirring to a 25 per cent solution of C₆H₅SiCl₃ in pyridine in amount to give a chlorine to sodium ratio of 1.065. The mixture was stirred for 48 hours. Diethyl ether was added to the reaction mixture and the solution washed with water until neutral. Solvent and volatile materials were removed by warming under vacuum for 15 hours. An 86.4 per cent yield of a viscous oil containing no hydroxyl groups was obtained. After heating 24 hours at 250° C. a tough, flexible thermoplastic resin was obtained.

*Example 20*

NaOH was added to (CH₃)₃SiOC₂H₅ in amount to give a sodium to silicon atomic ratio of 1. The reaction mixture was refluxed for 42 hours. Sufficient methanol was added to the reaction mixture to disperse the alkali. The alcohol and water were removed by distillation under vacuum. The residue was extracted with boiling petroleum ether of boiling range 90–100° C. The petroleum ether extract was evaporated to dryness and dehydrated by heating under vacuum. The salt was purified by sublimation at 130–140° C. under high vacuum. The neutralization equivalent of the salt so obtained was 113. The calculated neutralization equivalent of the anhydrous salt is 112.

A copolymer consisting of trimethyl siloxane structural units and siloxane structural units containing no organic substituents was prepared by adding this salt as a 35.6 per cent solution in petroleum, boiling range 30–60° C. with stirring to a 30.9 per cent solution of SiCl₄ in petroleum ether, boiling range 30–60° C., to give a sodium to chlorine atomic ratio of 1. A precipitate of NaCl formed immediately. After 3 hours at 25° C., the NaCl was removed by filtration. The solvent was removed from the filtrate by distillation at reduced pressure. The residue from the filtrate was fractionally distilled at 12 mm. pressure. The expected compound

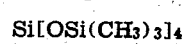
Si[OSi(CH₃)₃]₄ was obtained.

*Example 21*

A copolymer consisting of trimethyl siloxane and monomethyl siloxane structural units was prepared by adding a solution of (CH₃)₃SiONa, prepared as in Example 20, in petroleum ether, boiling range 30–60° C., with stirring to a solution of CH₃SiCl₃ in petroleum ether, boiling range 30–60° C., in amount to give a chlorine to sodium atomic ratio of 1. The reaction vessel was cooled by indirect heat exchange with ice. The reaction mixture was washed with water until neutral. The solvent was removed by distillation at atmospheric pressure. The residue was fractionally distilled at 14 mm. pressure. The expected product, CH₃Si[OSi(CH₃)₃]₃ was obtained.

*Example 22*

A copolymer consisting of trimethyl siloxane and monophenyl siloxane structural units was prepared by adding a 39 per cent by weight solution of (CH₃)₃SiONa, prepared as in Example 20, in petroleum ether, boiling range 30–60° C., with stirring to a 39 per cent by weight solution of C₆H₅SiCl₃ in anhydrous pyridine in amount to give a chlorine to sodium ratio of 1. After stirring for 12 hours, the solution was washed neutral and dried over anhydrous potassium carbonate. The solvent was removed by distillation and the reaction products were fractionally distilled under reduced pressure. C₆H₅Si[OSi(CH₃)₃]₃, boiling point 105–110° C. at 13 mm., was separated and identified.

*Example 23*

A copolymer consisting of trimethyl and triphenyl siloxane structural units was prepared by adding (CH₃)₃SiONa, prepared as in Example 20, as a 2.2 per cent solution in anhydrous diethyl ether with stirring to a 8.2 per cent solution of (C₆H₅)₃SiCl in anhydrous diethyl ether in amount to give a sodium to chlorine atomic ratio of 1. The reaction was complete in 20 hours at room temperature. The precipitated sodium chloride, which was produced during the reaction, was removed by filtration. The solvent was removed from the filtrate at reduced pressure, and the residue was washed with ethanol. An essentially quantitative yield of 1,1,1-trimethyl-3,3,3-triphenyl disiloxane (melting point 47–49° C.) was obtained.

*Example 24*

NaOH was added to [(C₆H₅)(CH₃)₂Si]₂O in a reaction vessel in amount to give sodium to silicon atomic ratio of 1. The reaction mixture was heated to a temperature of 125° C. Small amounts of methanol to aid in dispersing the alkali were added gradually to the reaction mixture during the heating. The reaction mixture was heated under vacuum at 100–120° C. to remove water and alcohol. The crystalline mass obtained by the vacuum treatment was dissolved in a mixed solvent composed of equal volumes of methanol and toluene. The toluene soluble portion of the residue was heated at 225° C. at a pressure of 0.1 mm. The viscous, partially crystalline mass remaining had a neutralization equivalent of 181. The calculated neutralization equivalent of (C₆H₅)(CH₃)₂SiONa is 174.

A copolymer consisting of phenyl dimethyl siloxane and trimethyl siloxane structural units was prepared by adding a 45 per cent solution of (C₆H₅)(CH₃)₂SiONa, as above prepared, in diethyl ether with stirring to (CH₃)₃SiCl in amount to give sodium to chlorine atomic ratio of 1. NaCl precipitated throughout the addition. The reaction was complete in 4 hours. The residue was distilled at reduced pressure. An essentially quantitative yield (C₆H₅)(CH₃)₂Si-O-Si(CH₃)₃, which had a boiling point of 95–96° C. at 15 mm. pressure, was obtained.

*Example 25*

Na₂O containing a small amount of water was added to [(C₆H₅)₂(CH₃)Si]₂O in amount to give a sodium to silicon atomic ratio of 1. The reaction mixture was heated to a temperature of 140–150° C. Small amounts of methanol to aid in dispersing the alkali were added to the reaction mixture during the heating. Methanol and water were removed by heating under a vacuum. The viscous product remaining after the vacuum treatment was extracted with boiling toluene. The toluene solution was evaporated, and the residue was dissolved in petroleum ether of boiling range 90–100° C. Upon the addition of petroleum ether of boiling range 30–60° C., the mono-hydrate of (C₆H₅)₂(CH₃)SiONa precipitated. The mono-hydrate was dehydrated by heating at 170–180° C. for 5 to 6 hours at a pressure of 5 to 18 mm. The neutralization equivalent of the salt so obtained was 238. The calculated neutralization equivalent of the anhydrous salt is 236.

A copolymer consisting of diphenyl methyl siloxane and triphenyl siloxane structural units was prepared by adding the salt (C₆H₅)₂(CH₃)SiONa

prepared as above, with stirring to a 22 per cent solution of (C₆H₅)₃SiCl in benzene vessel in amount to give a sodium to chlorine atomic ratio of 1. NaCl precipitated during the addition. The benzene was removed by distillation, and a mixed solvent composed of equal parts by weight of benzene and diethyl ether was added. The mixture was refluxed for 4 hours to insure complete reaction. The NaCl was removed by filtration and the solvent removed by distillation. The reaction product was recrystallized from ethyl acetate and again from petroleum ether, boiling range 30 to 60° C. A 90 per cent yield of

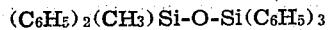

(C₆H₅)₂(CH₃)Si-O-Si(C₆H₅)₃ melting point 74–75.8° C. was obtained.

I claim:

1. The method of preparing organosiloxane materials which comprises reacting an alkali metal salt of an organo silanol, in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds, whereby a siloxane is produced in which the silicon of the silanol is linked to the silicon of the silicon halide through an oxygen atom.

2. The method of preparing organosiloxane materials which comprises reacting an alkali metal salt of an organo silanol, in which the organic radicals are monovalent hydrocarbon radicals free of aliphatic unsaturation and are linked to the silicon by carbon to silicon bonds, with an organosilicon halide in which all of the organic radicals are monovalent hydrocarbon radicals free of aliphatic unsaturation, and are linked to the silicon by carbon to silicon bonds, whereby a siloxane is produced in which the silicon of the silanol is linked to the silicon of the silicon halide through an oxygen atom.

3. The method of preparing organosiloxane materials which comprises reacting an alkali metal salt of an organo silanol, in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds whereby an organosiloxane is produced in which silicon of the silanol is linked to silicon of the silicon halide by an oxygen atom, and separating the organosiloxane so produced from alkali metal halide produced by the reaction.

4. The method of preparing organosiloxane materials which comprises reacting an alkali metal salt of an organo silanol, in which the organic radicals are monovalent hydrocarbon radicals free of aliphatic unsaturation and are linked to the silicon by carbon to silicon bonds, with a silicon chloride in which any organic radicals present therein are monovalent hydrocarbon radicals free of aliphatic unsaturation and are linked to the silicon by carbon to silicon bonds in the absence of moisture, in such proportions that the atomic ratio of chlorine to alkali metal is at least 1, and separating organosiloxane so produced from alkali metal chloride produced by the reaction.

5. The method of preparing organosiloxane materials which comprises reacting an alkali metal salt of an organo silanol, in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds in such proportions that the atomic ratio of halogen to alkali metal is at least 1, and separating organosiloxane so produced from alkali metal halide produced by the reaction.

6. The method of preparing organosiloxane materials which comprises reacting an alkali metal salt of a monoorgano silanol in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds, whereby a siloxane is produced in which the silicon of the silanol is linked to the silicon of the silicon halide through an oxygen atom.

7. The method of preparing organosiloxane materials which comprises reacting an alkali metal salt of a diorgano silanol in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds, whereby a siloxane is produced in which the silicon of the silanol is linked to the silicon of the silicon halide through an oxygen atom.

8. The method of preparing organosiloxane materials which comprises reacting an alkali metal salt of a triorgano silanol in which the organic radicals are monovalent hydrocarbon radicals free of aliphatic unsaturation and are linked to the silicon by carbon to silicon bonds, with a silicon halide in which any organic radicals present therein are monovalent hydrocarbon radicals free of aliphatic unsaturation and are linked to the silicon by carbon to silicon bonds, whereby a siloxane is produced in which the silicon of the silanol is linked to the silicon of the silicon halide through an oxygen atom.

JAMES FRANKLIN HYDE.

REFERENCES CITED

The following references are of record in the file of this patent:

UNITED STATES PATENTS

| Number | Name | Date |
| --- | --- | --- |
| 2,438,055 | Hyde | Mar. 16, 1948 |
| 2,443,353 | Hyde | June 15, 1948 |
| 2,453,092 | Hyde | Nov. 2, 1948 |

OTHER REFERENCES

Volnov et al.: "Jour. Gen. Chem.," U. S. S. R., vol. 10 (1940), pages 1600–1604.

Sommer et al.: "Jour. Amer. Chem. Soc.," vol. 68 (1946), pages 485–487.